United States Patent
Bloom et al.

(10) Patent No.: US 12,510,602 B2
(45) Date of Patent: Dec. 30, 2025

(54) SYSTEM AND METHOD FOR OPTIMIZING POWER DELIVERY IN A MULTIPLE OUTPUT DYNAMICALLY ADJUSTABLE CAPACITY SYSTEM BATTERY

(71) Applicant: GM Global Technology Operations LLC, Detroit, MI (US)

(72) Inventors: Aaron B. Bloom, Royal Oak, MI (US); Dave Gerard Rich, Sterling Heights, MI (US); Robert A. De Stefano, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 18/172,013

(22) Filed: Feb. 21, 2023

(65) Prior Publication Data

US 2024/0280644 A1    Aug. 22, 2024

(51) Int. Cl.
*G01R 31/392*    (2019.01)
*B60L 58/16*    (2019.01)
*G01R 31/367*    (2019.01)
*G01R 31/3835*    (2019.01)

(52) U.S. Cl.
CPC ............ *G01R 31/392* (2019.01); *B60L 58/16* (2019.02); *G01R 31/367* (2019.01); *G01R 31/3835* (2019.01)

(58) Field of Classification Search
CPC . G01R 31/392; G01R 31/3835; G01R 31/367
See application file for complete search history.

(56) References Cited

U.S. PATENT DOCUMENTS 10,664,562 B2 *    5/2020    Balasingam ....... G01R 31/3842
2020/0278936 A1 *    9/2020    Gopalakrishnan ........ G06F 1/26

FOREIGN PATENT DOCUMENTS

FR    2992487 A1 *    12/2013 ............ H01M 10/42

* cited by examiner

*Primary Examiner* — Lam S Nguyen
(74) *Attorney, Agent, or Firm* — CANTOR COLBURN LLP

(57) ABSTRACT

A vehicle, a Multiple Output Dynamically Adjustable Capacity System (MODACS) of the vehicle and a method of operating the MODACS. The MODACS includes a string and a processor. The string is coupled to a grid. A grid voltage is set to a first set point. The processor is configured to detect a change in a state of health of the string and change the grid voltage from the first set point to a second set point in response to the change in the state of health of the string.

20 Claims, 6 Drawing Sheets

SYSTEM AND METHOD FOR OPTIMIZING POWER DELIVERY IN A MULTIPLE OUTPUT DYNAMICALLY ADJUSTABLE CAPACITY SYSTEM BATTERY

INTRODUCTION

The subject disclosure relates to operation of a Multiple Output Dynamically Adjustable Capacity System (MODACS) in a vehicle and, in particular, to a system and method for diagnosing a health of the MODACS and to set a grid voltage set point for the MODACS based on its health.

A MODACS is a power unit for a plurality of electrical units of a vehicle. The MODACS includes a plurality of energy storage strings that can be configured as needed to meet the changing power demands of the vehicle as required by the plurality of electrical units. Current battery regulators maintain a same operating set point for the battery regardless of the age of the battery. However, as the battery ages, maintaining the same operating set point results in operating the battery at non-optimal set points. Accordingly, it is desirable to provide a system and method for establishing a set point for optimal power delivery based on the state of health of the battery.

SUMMARY

In one exemplary embodiment, a method of operating a Multiple Output Dynamically Adjustable Capacity System (MODACS) battery is disclosed. A grid voltage of the MODACS battery is set to a first set point. A change is detected in a state of health of the MODACS battery. The grid voltage is changed from the first set point to a second set point upon detection of the change in the state of health of the MODACS battery.

In addition to one or more of the features described herein, the method further includes detecting the change in the state of health by detecting a response of the battery to a diagnostic load applied to the battery. The method further includes applying the diagnostic load to the battery, measuring a voltage drop at the MODACS battery in response to the diagnostic load being applied, comparing the voltage drop to a voltage threshold, and raising the grid voltage when the voltage drop is greater than or equal to the voltage threshold. The method further includes lowering the grid voltage when applying the MODACS battery provides excess energy to the diagnostic load. The method further includes applying the diagnostic load via one of an intrusive test and a nonintrusive test. When applying the diagnostic load in the nonintrusive test, the method further includes determining the response to the diagnostic load using a Kalman filter. The method further includes changing the grid voltage to a plurality of second set points.

In another exemplary embodiment, a Multiple Output Dynamically Adjustable Capacity System (MODACS) is disclosed. The MODACS includes a string and a processor. The string is coupled to a grid. The processor is configured to set a grid voltage of the grid to a first set point, detect a change in a state of health of the string, and change the grid voltage from the first set point to a second set point in response to the change in the state of health of the string.

In addition to one or more of the features described herein, the processor is further configured to detect the change in the state of health by detecting a response of the string to a diagnostic load applied to the string. The processor is further configured to apply the diagnostic load to the string, measure a voltage drop at the string in response to the diagnostic load being applied, compare the voltage drop to a voltage threshold, and raise the grid voltage when the voltage drop is greater than or equal to the voltage threshold. The processor is further configured to lower the grid voltage when the string provides excess energy to the diagnostic load. The processor is further configured to apply the diagnostic load in one of an intrusive test and a nonintrusive test. For when the diagnostic load is applied in the nonintrusive test, the processor is further configured determine the response to the diagnostic load using a Kalman filter. The processor is further configured to change the grid voltage to a plurality of second set points.

In yet another exemplary embodiment, a vehicle is disclosed. The vehicle includes a Multiple Output Dynamically Adjustable Capacity System (MODACS) and a processor. The MODACS includes a string coupled to a grid. The processor is configured to set an operating voltage of the grid to a first set point, detect a change in a state of health of the string, and change the operating voltage of the grid from the first set point to a second set point in response to the change in the state of health of the string.

In addition to one or more of the features described herein, the processor is further configured to detect the change in the state of health by detecting a response of the string to a diagnostic load applied to the string. The processor is further configured to apply the diagnostic load to the string, measure a voltage drop at the string in response to the diagnostic load being applied, compare the voltage drop to a voltage threshold, and perform at least one of raise the set point when the change in voltage is greater than or equal to the voltage threshold and lower the grid voltage when applying the diagnostic load provides excess energy from the string. The processor is further configured to apply the diagnostic load in one of an intrusive test and a nonintrusive test. For when the diagnostic load is applied in the nonintrusive test, the processor is further configured to determine the response to the diagnostic load using a Kalman filter. The processor is further configured to change the grid voltage to a plurality of second set points.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
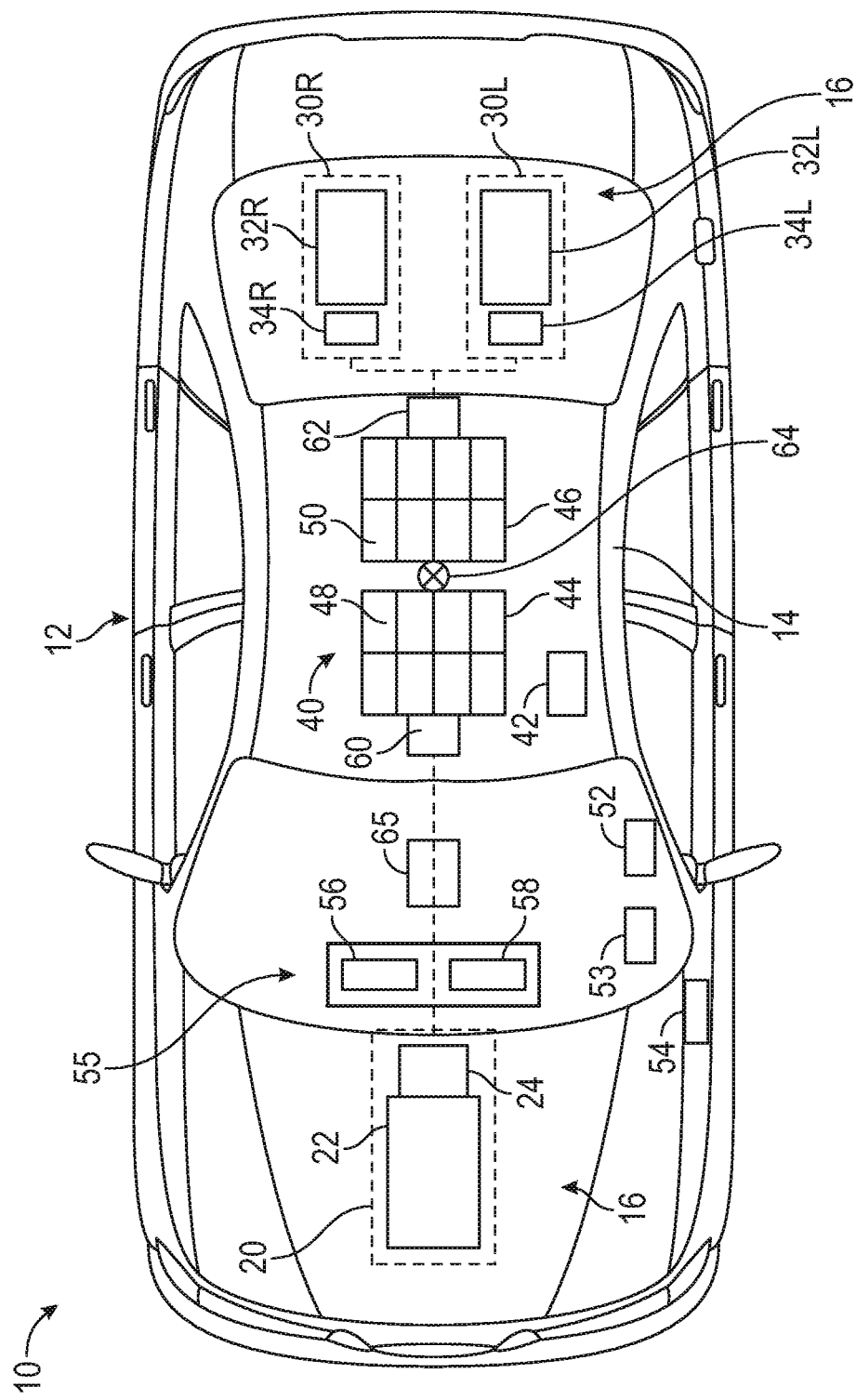
FIG. 1 shows an embodiment of a motor vehicle.

The following description is merely exemplary in nature and is not intended to limit the present disclosure, its application or uses. It should be understood that throughout the drawings, corresponding reference numerals indicate like or corresponding parts and features.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes an electric motor 32L and an inverter 34L. A right rear drive unit 30R includes an electric motor 32R and an inverter 34R. The inverters 24, 34L and 34R (e.g., power inverter units or PIMs) each convert DC power from a high voltage (HV) battery system 40 to poly-phase (e.g., two-phase, three-phase, six-phase, etc.) alternating current (AC) power to drive the motors 22 and 32L and 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives front wheels (not shown) and the rear electric motors 32L and 32R drive rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the drive units 20, 30L and 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the inverter 24, and a second battery pack 46. The battery pack 44 includes a plurality of battery modules 48, and the battery pack 46 includes a plurality of battery modules 50. Each module 48, 50 includes a number of individual cells (not shown). In various embodiments, one or more of the battery packs can include a MODACS (Multiple Output Dynamically Adjustable Capacity) battery, as described herein with respect to FIGS. 2-4.

Each of the front motor 22 and the rear motors 32L and 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the battery packs 44 and 46, and selectively connecting the battery packs 44 and 46 to the drive systems 20, 30L and 30R. The switching devices may also be operated to selectively connect the battery pack 44 and the battery pack 46 to a charging system. The charging system can be used to charge the battery pack 44 and the battery pack 46, and/or to supply power from the battery pack 44 and/or the battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects the battery pack 44 to the inverters 24, 34L and 34R, and a second switching device 62 that selectively connects the battery pack 46 to the inverters 24, 34L and 34R. The switching system also includes a third switching device 64 (also referred to as a "battery switching device") for selectively connecting the battery pack 44 to the battery pack 46 in series.

Any of various controllers can be used to control functions of the battery system 40, the switching system and the drive units. A controller includes any suitable processing device or unit, and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

As illustrated herein, the vehicle 10 is an electric vehicle. In alternative embodiments, the vehicle 10 can be an internal combustion engine vehicle, a hybrid vehicle, etc.

Figure 2:
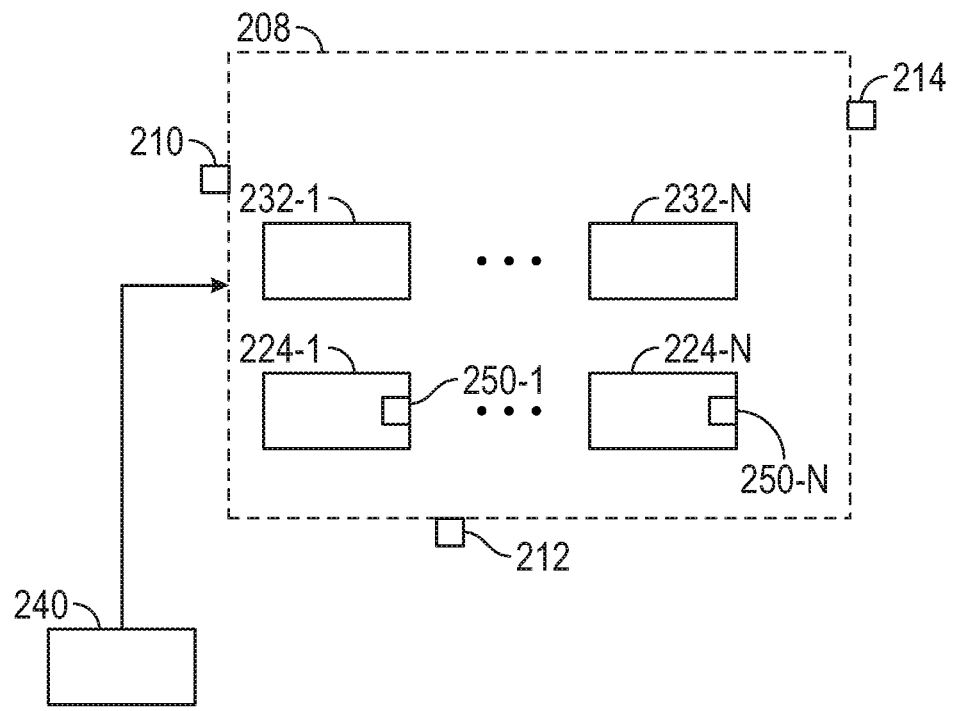
FIG. 2 is a functional block diagram of an example battery system of the vehicle.

FIG. 2 is a functional block diagram of an example battery system of the vehicle. The battery 208 has at least two (positive) output terminals and a negative terminal to provide at least two direct current (DC) operating voltages. For example only, the battery 208 may have a first positive (e.g., 48 Volt (V) nominal) terminal 210, a negative terminal 212, and a second positive (e.g., 12 V nominal) terminal 214. While the example of the battery 208 having a 48 V nominal operating voltage and a 12 V nominal operating voltage is provided, the battery 208 may have one or more other operating voltages.

The battery 208 includes a plurality of battery modules, such as a first battery module 224-1, ..., and an N-th battery module 224-N ("battery modules 224"), where N is an integer greater than or equal to 2. In various implementations, N may be equal to 2, 3, 4, 5, 6, 8, 10, 12, or another suitable number.

Figure 4:
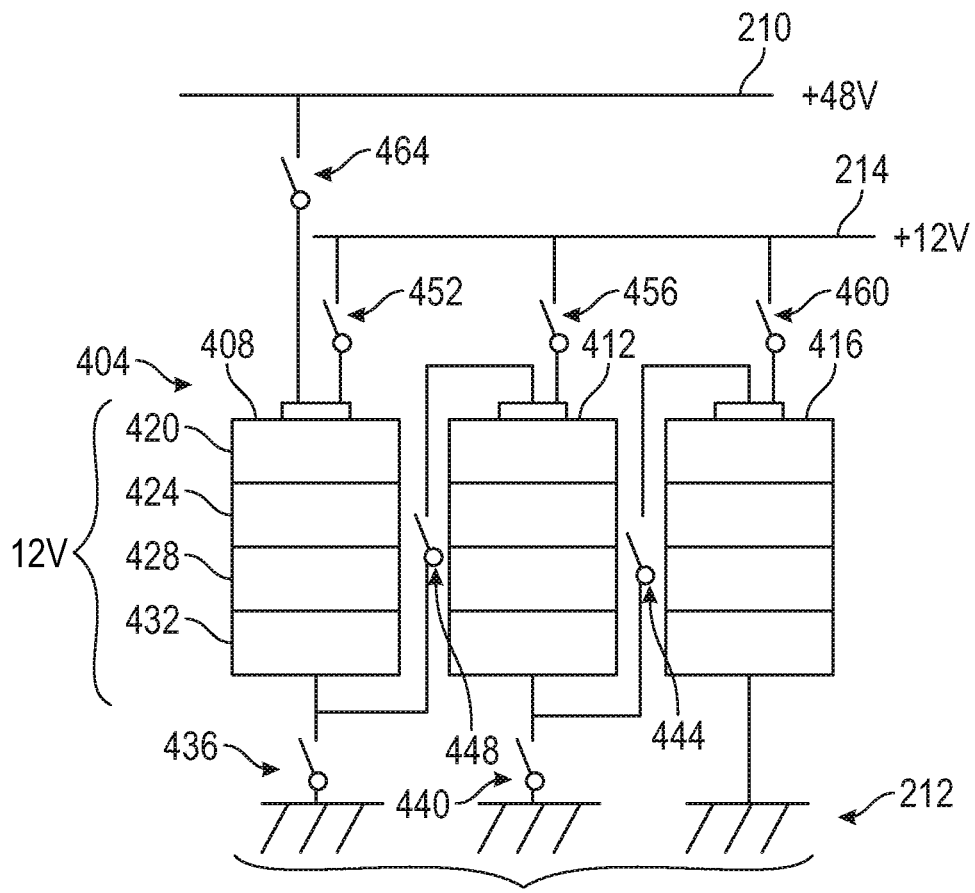
FIG. 4 is a functional block diagram of an example implementation of a battery module of the battery system.

As discussed further herein with respect to FIG. 4, each of the battery modules 224 includes multiple battery strings. Each battery string may be individually replaceable. The battery strings are also individually isolatable, for example, in the event of a fault in a battery string. In various implementations, the battery 208 may have the form factor of a standard automotive grade 12 V battery.

The battery 208 includes a plurality of switches, such as first switches 232-1, ..., N-th switches 232-N (collectively "switches 232"). The switches 232 enable the battery strings of the battery modules 224 to be connected in series, parallel, or combinations of series and parallel to provide target output voltages and capacities at the output terminals.

A switch control module 240 controls the switches 232 to provide desired output voltages and capacities at the output terminals. The switch control module 240 controls the switches 232 using model predictive control (MPC) or another type of balancing control to as closely as possible balance the state of charges (SOCs) of the battery strings, as discussed further below. The switch control module 240 also controls the switches 232 based on balancing temperatures of the battery strings of each battery module and temperatures of the battery modules.

Figure 3A:
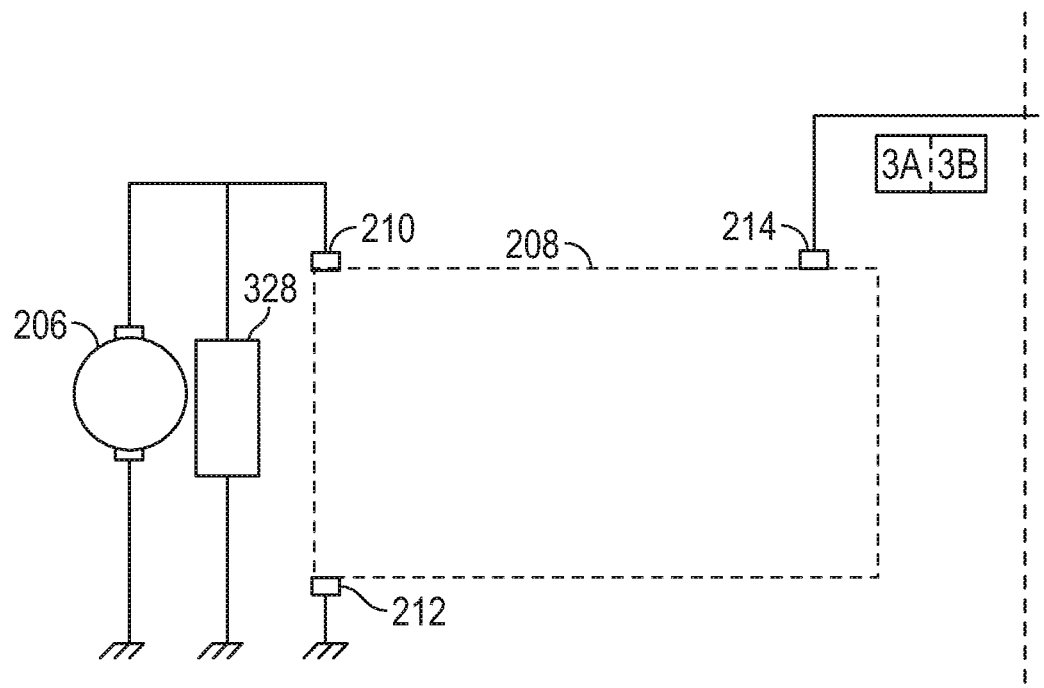
FIGS. 3A-3B are a schematic including an example battery system including the battery.
Figure 3B:
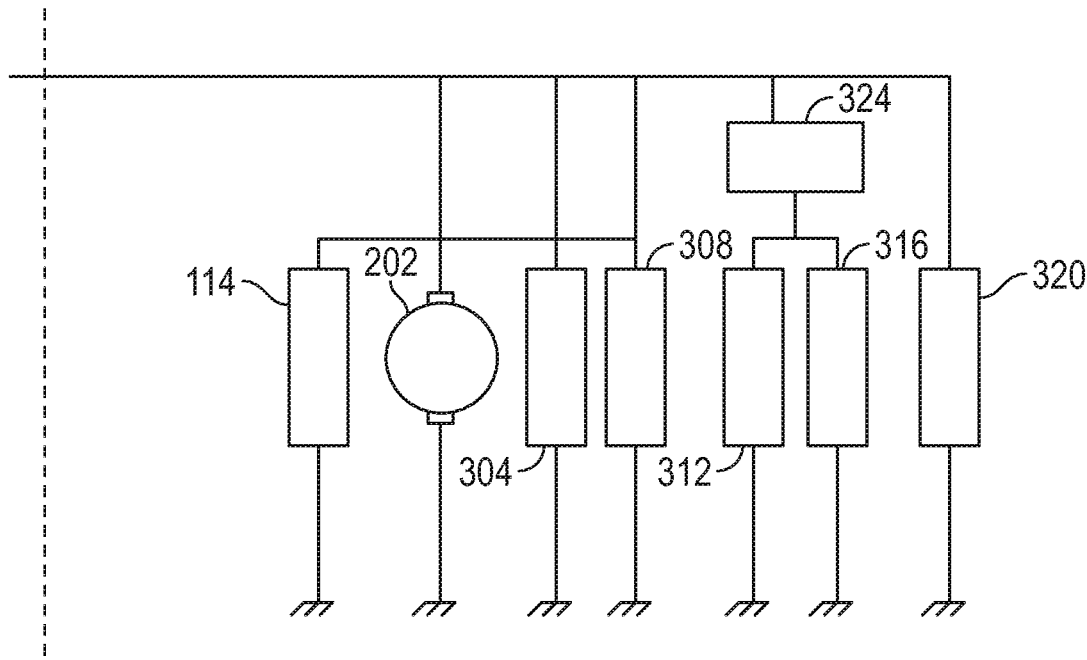

FIGS. 3A-3B are a schematic diagram including an example battery system including the battery 208. Sets of the battery strings are connectable in series (via ones of the switches 232) to the first positive terminal 210 and the negative terminal 212 to provide a first nominal output voltage (e.g., 48 V) via the first positive terminal 210. Individual ones of the battery strings can be connected (via ones of the switches 232) to the second positive terminal 214 and the negative terminal 212 to provide a second nominal output voltage (e.g., 12 V) via the second positive terminal 214. How many of the battery strings are connected to the first positive terminal 210 and the second positive terminal 214 dictates the portions of the overall capacity of the battery 208 available at each of the positive terminals.

As shown in FIG. 3B, a first set of vehicle electrical components operates using one of the two or more operating voltages of the battery 208. For example, the first set of vehicle electrical components may be connected to the second positive terminal 214. The first set of vehicle electrical components may include, for example but are not limited to, the electronic control module 114 and other control modules of the vehicle, a starter motor 202, and/or other electrical loads, such as first 12 V loads 304, second 12 V loads 308, other control modules 312, third 12 V loads 316, and fourth 12 V loads 320. In various implementations, a switching device 324 may be implemented.

As shown in FIG. 3A, a second set of vehicle electrical components operates using another one of the two or more operating voltages of the battery 208. For example, the second set of vehicle electrical components may be connected to the first positive terminal 210. The second set of vehicle electrical components may include, for example but are not limited to, the generator 206 and various electrical loads, such as 48 V loads 328. The generator 206 may be controlled to charge the battery 208.

Each of the switches 232, FIG. 2, may be an insulated gate bipolar transistor (IGBT), a field effect transistor (FET), such as a metal oxide semiconductor FET (MOSFET), or another suitable type of switch.

FIG. 4 is a functional block diagram of an example implementation of one of the battery modules 224, numbered battery module 404, and one set of the switches 232. Each of the battery modules 224 may be identical to 404, and each set of the switches 232 may be connected identically to that of 404.

The battery module 404 includes three battery strings, 408, 412, and 416. The battery strings 408-416 are identical and each include four battery cells 420, 424, 428, and 432. The battery cells 420-432 are connected in series to provide the second operating voltage (e.g., 12 V). Each of the battery cells 420-432 may be, for example, a 3 V battery cell or have another suitable voltage to provide the second operating voltage when the battery cells 420-432 are connected in series. The battery cells 420-432 may be, for example lithium ferrophosphate (LFP) battery cells or NMC (nickel-manganese-cobalt) or have another suitable chemistry. In various embodiments, the battery cells 420-432 can include cathodes that are made of materials such as LFP and NMC and anodes made of graphite, silicon-based materials or Lithium-Titanate. (LTO).

Negative terminals of the battery strings 408-416 are connected to the negative terminal 212. The negative terminals of the battery strings 408 and 412 are connected to the negative terminal 212 via switches 436 and 440, respectively, when the switches 436 and 440 are closed. The switches 436 and 440 can open to disconnect the negative terminals of the battery strings 408 and 412 from the negative terminal 212. The negative terminal of the battery string 416 may be directly connected to the negative terminal 212.

The positive terminal of the battery string 416 is connected to the negative terminal of the battery string 412 such that the battery strings 412 and 416 are connected in series when switch 444 is closed. The switch 444 can be opened to disconnect the positive terminal of the battery string 416 from the negative terminal of the battery string 412. The positive terminal of the battery string 412 is connected to the negative terminal of the battery string 408 such that the battery strings 412 and 408 are connected in series when switch 448 is closed. The switch 448 can be opened to disconnect the positive terminal of the battery string 412 from the negative terminal of the battery string 408.

Switches 452, 456, and 460 respectively connect and disconnect the positive terminals of the battery strings 408, 412, and 416 to and from a first bus (e.g., 12 V bus) that is connected to the second positive terminal 214. Switch 464 connects and disconnects the positive terminal of the battery string 408 to and from a second bus (e.g., a 48 V bus) that is connected to the first positive terminal 210.

The switch control module 240, FIG. 2, controls switching of the switches of each of the battery modules 224 (the set of switches). At any given time, the switch control module 240 may actuate the switches associated with a battery module such that the battery module is in an open (X) configuration, a series (S) configuration, or a parallel (P) configuration. FIG. 4 includes an example illustration of the battery module 404 in the open (X) configuration. When a battery module is in the open (X) configuration, all the battery strings of the battery module are disconnected from both the first positive terminal 210 and the second positive terminal 214.

Figure 5:
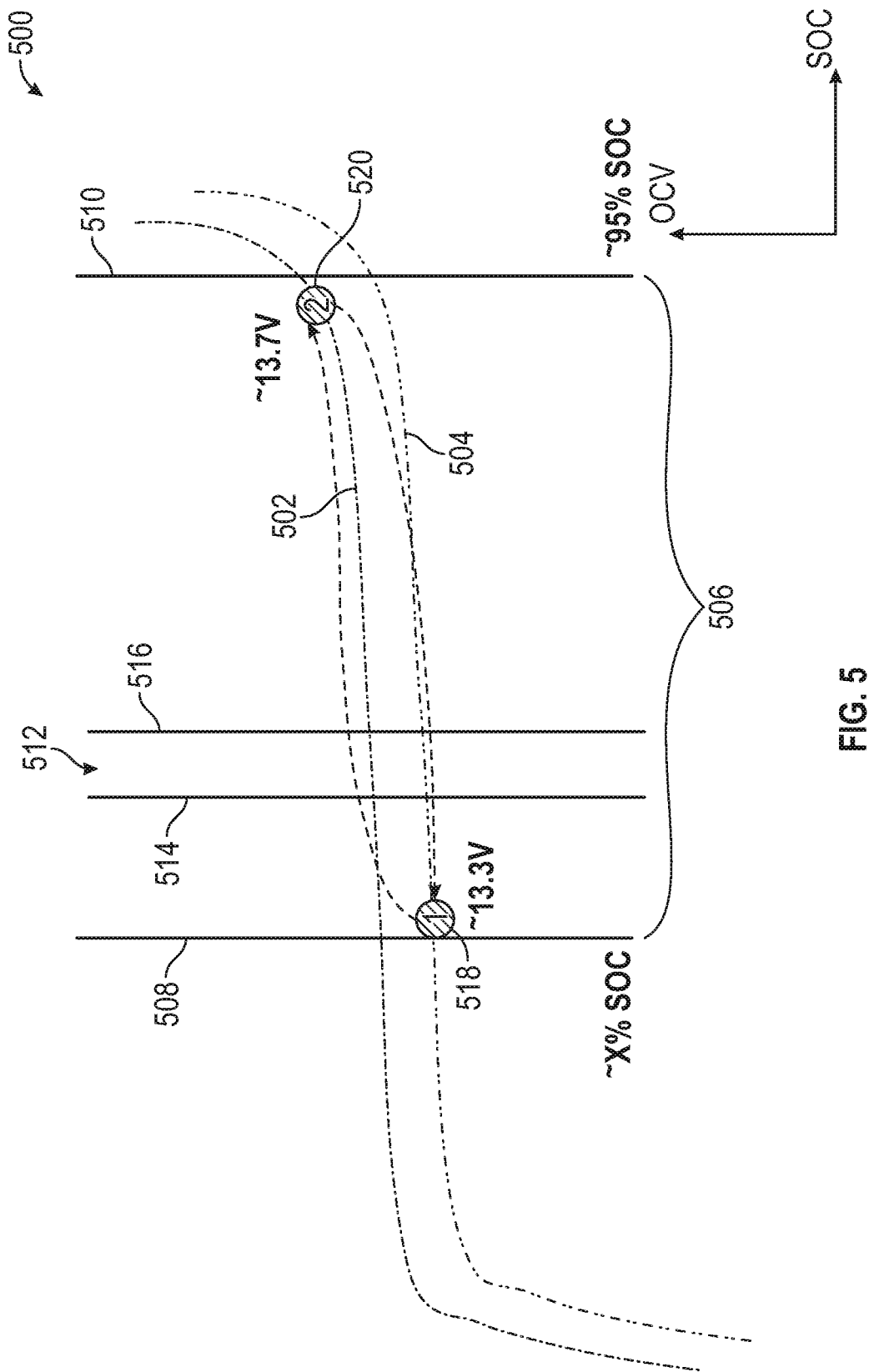
FIG. 5 shows a graph of a charge curve and a discharge curve for a string of the MODACS, in an illustrative embodiment.

FIG. 5 shows a graph 500 of a charge curve 502 and a discharge curve 504 for a string of the MODACS, in an illustrative embodiment. State of charge (SOC) is shown along the abscissa and over-charge voltage (OCV) is shown along the ordinate axis. The charge curve 502 represents a relation between over charge voltage and SOC on a string during a charging operation and the discharge curve 504 represents a relation between voltage and SOC on the string during a discharging operation. The charge curve 502 and the discharge curve 504 are separated by a gap representing a hysteresis between charging and discharging operations. The size of the gap (i.e., the amount of voltage separation) between the charge curve 502 and the discharge curve 504 increases as the charging/discharging rate on the battery increase and decreases as the charging/discharging rate decreases on the battery.

The battery operates within an SOC range 506 for the string defined by a low SOC boundary 508 and a high SOC boundary 510. The low SOC boundary 508 can be a minimum charge at which the string remains operable. The high SOC boundary 510 can be a maximum possible charge or an optimal charge on the string. For illustrative purposes, the high SOC is shown as 95%.

FIG. 5 further illustrates a charge/discharge operation between a low SOC point (first point 518) and a high SOC point (second point 520). For illustrative purposes, the voltage at the first point 518 is about 13.3 V and the voltage at the second point 520 is about 13.7 V. An auxiliary power module (APM 708 (FIG. 7)) can be used to perform the charging and discharging. Starting at the first point 518, the voltage is raised to start the charging operation. The voltage of the string jumps from first point 518 to (along the discharge curve 504) to a point along the charge curve 502 with little or no change in SOC. The SOC then changes by moving along the charge curve until the second point 520 is reached. At the second point 520, voltage is lowered to start the discharging operation. The voltage of the string drops from the second point 520 to a point along the discharge curve 504 with little or no change in SOC. The SOC then changes by moving along the discharge curve 504 until the first point 518 is reached.

A test region 512 is shown within the SOC boundaries. The test region 512 is bounded by first test region boundary 514 at its low SOC end and a second test region boundary 516 at its high SOC end. The test region includes a region at which the charging curve and the discharging curve are generally flat or have a small slope. Within the test region 512, the voltage changes very little with change in SOC.

For a new or healthy battery, the difference between the low SOC boundary 508 and the high SOC boundary 510 is great. This difference decreases as the battery ages. For a new or healthy battery, the battery can be set to an SOC set point that is close to the low SOC boundary 508, at which point the battery is able to meet electrical load requirements without providing excess power to the loads. Setting the SOC set point low also prolongs the life of the battery. As the battery ages, the SOC set point is raised to allow the battery to meet the same load requirements. A diagnostic test can be performed to determine an SOC set point (and hence a grid voltage set point for the battery) that allows the battery to meet electrical load requirements. In an embodiment, the diagnostic test includes applying or introducing an electrical load to the battery and measuring a voltage response at the battery in response to applying the electrical load. When the SOC set point is too low, the electrical load causes a transient voltage drop. As the SOC set point is raises, the magnitude of the transient voltage drop in response to the electric load is reduced. By comparing the magnitude of the transient voltage drop to a voltage drop threshold, a new SOC set point can be determined.

Figure 6:
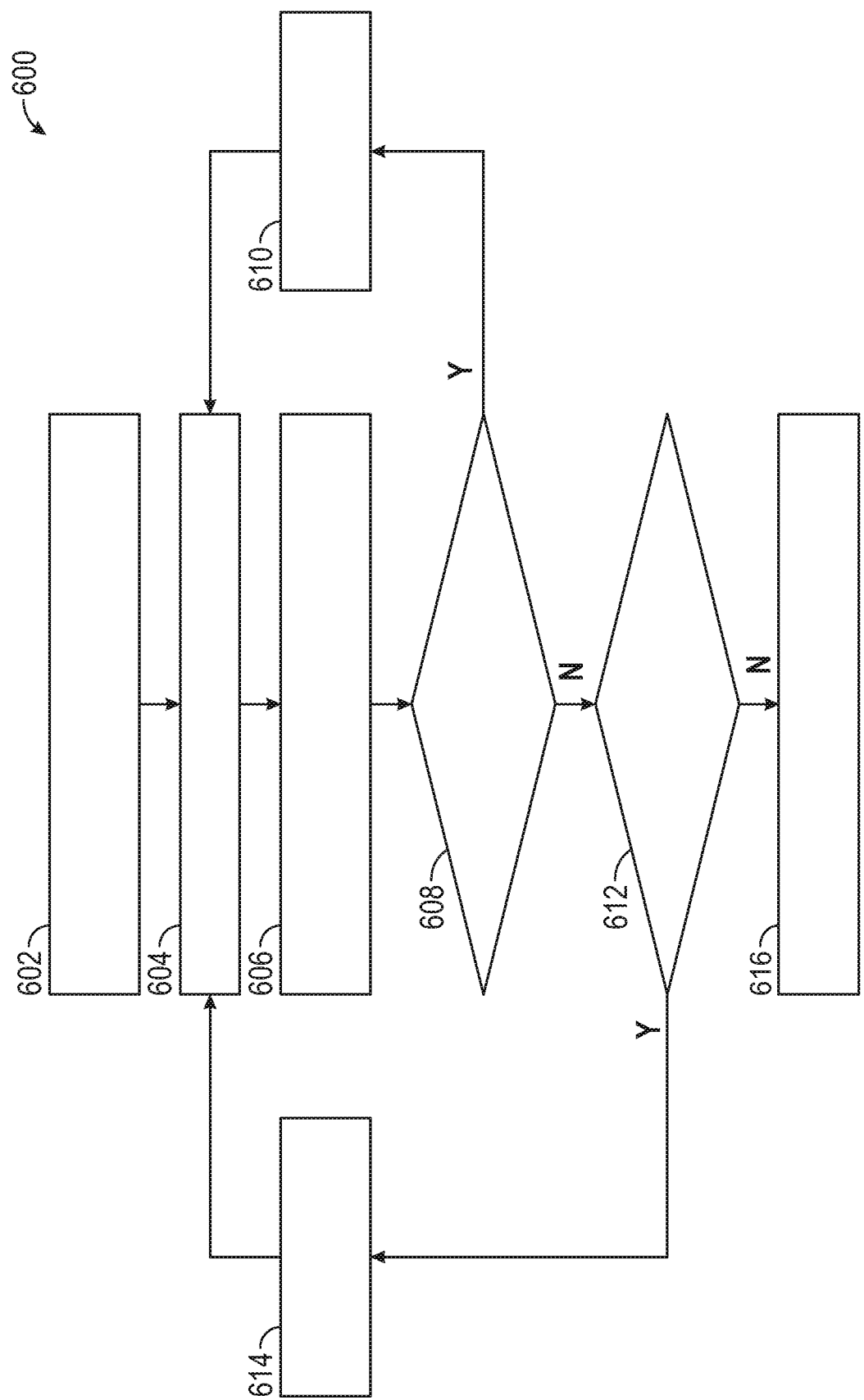
FIG. 6 shows a flowchart of a string diagnosis operation in an embodiment.

FIG. 6 shows a flowchart 600 of a string diagnosis operation in an embodiment. The operation begins at box 602 by setting a grid voltage across the string to a first grid voltage set point or first set point, which results in a first SOC set point along the string. In box 604, an electrical load (a diagnostic load) is applied to the string. In box 606, a voltage drop is measured that occurs across the string when the diagnostic load is applied. In box 608, the measured voltage drop is compared to a voltage drop threshold. If the measured voltage drop is greater than the voltage drop threshold, the method proceeds to box 610. In box 610, the SOC is raised (i.e., the grid voltage is raised). The method then proceeds back to box 604, where the diagnostic load is again applied. Returning to box 608, if the measured voltage drop is less than or equal to the voltage drop threshold, the method proceeds to box 612. In box 612, the measured power through the diagnostic load is measured to determine whether excess power is flowing through the diagnostic load. If excess power is flowing through the diagnostic load, the method proceeds to box 614. In box 614, the SOC is lowered (i.e., the grid voltage is lowered). Returning to box 612, if the amount excess power drawn is less than a power threshold, the method proceeds to box 616. In box 616, the gird voltage is established at a second grid voltage set or second set point, resulting in a second SOC set point at the battery.

The diagnostic testing of the flowchart 600 can be performed using either an intrusive test or nonintrusive test. In an intrusive test, an electrical load is introduced at the string by an active process. As an example, turning on a device that is otherwise off (e.g., honking a horn). A nonintrusive test includes testing the string under normal operating conditions of the vehicle, such as by the normal change in voltage and current during operation of the vehicle. In nonintrusive test, voltage and charge on the string are monitored over a long timeframe as these parameters fluctuate during the normal operation of the string. A Kalman filter can be applied to the voltage and charge measurements to determine the actual responses of the string. The actual responses can be compared to predicted or simulated responses in order to determine excess power or voltage drop thresholds.

Figure 7:
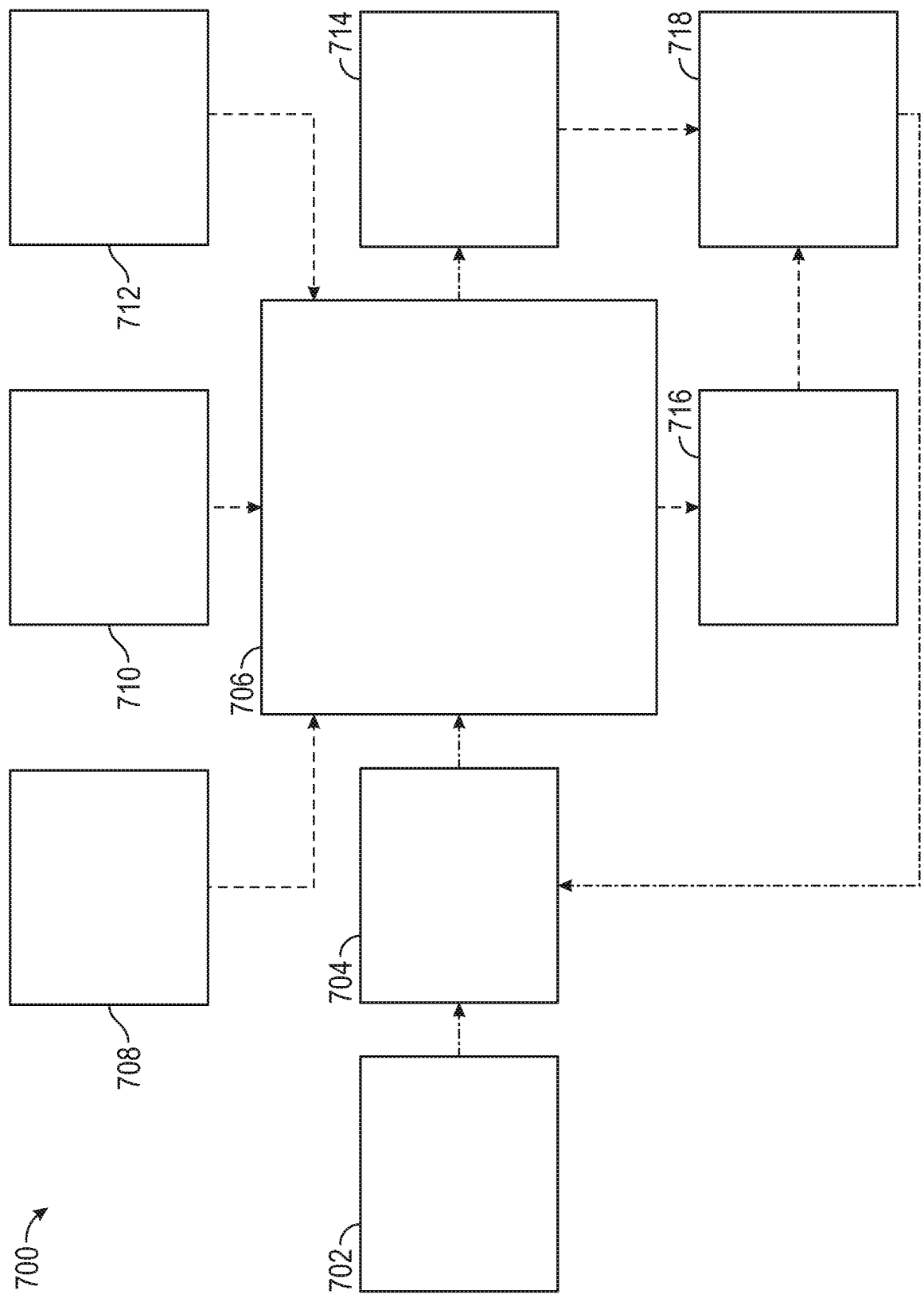
FIG. 7 shows a state diagram illustrating a method for setting a grid voltage set point.

FIG. 7 shows a state diagram 700 illustrating a method for setting a grid voltage set point. The method starts at state 702 in which the vehicle enters a "propulsion system active" state. In state 704, data is obtained regarding the MODACS, including measuring SOC, voltage, and cell temperatures. A state of health can be determined from these measurements. This data can be updated each time the method returns to state 704.

In state 706, setpoints for the battery are set, including grid voltage set point. Operation of state 706 can be controlled by input from an auxiliary power module (APM 708), a smart energy center (SEC) 710 and/or additional input 712. The APM 708 controls the SOC at the MODACS. The APM 708 can thus raise and lower the SOC at a string of the MODACS to run diagnostic testing. In various embodiments, the APM 708 can raise and lower the SOC at the string according to a duty cycle. The SEC 710 provides input/output requests and thereby controls when and how a diagnostic test is performed, including commencement time, charging rate, high and low SOC boundaries, etc. The SEC 710 can also decide whether to diagnose the string using active testing or passive testing. Additional input 712 includes a potential calibration for voltage loss occurring via power lines. In state 706, the result of the diagnostic testing is used by the MODACS or SEC to establish a grid voltage set point.

If, in state 706, a lower grid voltage is requested, state 714 is entered. If, in state 706, a higher grid voltage is requested, state 716 is entered. In state 714, the grid voltage is decreased at a given rate (e.g., about 1 volt every 100 seconds) to locate a suitable grid voltage set point. In state 716, the grid voltage is increased at a given rate (e.g., about 1 volt every 100 seconds) to locate a suitable grid voltage set point. State 718 indicates an increment in time step upon which state 704 is reentered.

In various embodiments, the set point of the grid voltage can be adjusted to match safety requirements for the electrical system or MODACS. Based on the results of the diagnostic testing, various loads can be either adjusted or shed from the MODACS as needed, to ensure that safety-related features are sufficiently powered. A controller or processor can notify a driver when safety-related features cannot be sufficiently powered or have to be turned off.

In various embodiments, a plurality of grid voltage set points can be established. The plurality of set points (e.g., bi-level set points, tri-level set points) can be used to detect safety issues and/or cyber security issues with the MODACS.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a Multiple Output Dynamically Adjustable Capacity System (MODACS) battery, comprising:
    setting a grid voltage of the MODACS battery to a first set point;
    applying a diagnostic load to the battery, measuring a voltage drop at the MODACS battery in response to the diagnostic load being applied, comparing the voltage drop to a voltage threshold; and
    lowering the grid voltage to a second set point less than the first set point when the voltage drop is less than the voltage threshold and when applying the MODACS battery provides excess energy to the diagnostic load.

2. The method of claim 1, further comprising raising the grid voltage when the voltage drop is greater than or equal to the voltage threshold.

3. The method of claim 1, further comprising applying the diagnostic load via one of: (i) an intrusive test; and (ii) a nonintrusive test.

4. The method of claim 3, wherein the diagnostic load is applied in the nonintrusive test, further comprising determining the response to the diagnostic load using a Kalman filter.

5. The method of claim 1, further comprising changing the grid voltage to a plurality of second set points.

6. The method of claim 1, further comprising lowering the SOC along with lowering the grid voltage.

7. The method of claim 2, further comprising raising the SOC along with raising the grid voltage.

8. A Multiple Output Dynamically Adjustable Capacity System (MODACS), comprising:
    a string coupled to a grid;
    a processor configured to:
        set a grid voltage of the grid to a first set point;
        apply a diagnostic load to the battery, measuring a voltage drop at the MODACS battery in response to the diagnostic load being applied, comparing the voltage drop to a voltage threshold; and
        lower the grid voltage to a second set point less than the first set point when the voltage drop is less than the voltage threshold and when applying the MODACS battery provides excess energy to the diagnostic load.

9. The MODACS of claim 8, wherein the processor is further configured to raise the grid voltage when the voltage drop is greater than or equal to the voltage threshold.

10. The MODACS of claim 8, wherein the processor is further configured to apply the diagnostic load in one of: (i) an intrusive test; and (ii) a nonintrusive test.

11. The MODACS of claim 10, wherein the diagnostic load is applied in the nonintrusive test, the processor being further configured determine the response to the diagnostic load using a Kalman filter.

12. The MODACS of claim 8, wherein the processor is further configured to change the grid voltage to a plurality of second set points.

13. The MODACS of claim 8, wherein the processor is further configured to comprising lower the SOC along with lowering the grid voltage.

14. The MODACS of claim 8, wherein the processor is further configured to comprising raise the SOC along with raising the grid voltage.

15. A vehicle, comprising:
    a Multiple Output Dynamically Adjustable Capacity System (MODACS) including a string coupled to a grid;
    a processor configured to:
        set an operating voltage of the grid to a first set point;
        apply a diagnostic load to the battery, measuring a voltage drop at the MODACS battery in response to the diagnostic load being applied, comparing the voltage drop to a voltage threshold; and
        lower a grid voltage to a second set point less than the first set point when the voltage drop is less than the voltage threshold and when applying the MODACS battery provides excess energy to the diagnostic load.

16. The vehicle of claim 15, wherein the processor is further configured to raise the set point when the change in voltage is greater than or equal to the voltage threshold.

17. The vehicle of claim 15, wherein the processor is further configured to apply the diagnostic load in one of: (i) an intrusive test; and (ii) a nonintrusive test.

18. The vehicle of claim 17, wherein the diagnostic load is applied in the nonintrusive test, the processor being further configured to determine the response to the diagnostic load using a Kalman filter.

19. The vehicle of claim 15, wherein the processor is further configured to change the grid voltage to a plurality of second set points.

20. The vehicle of claim 15, wherein the processor is further configured to performing at least one of: (i) lowering the SOC along with lowering the rid voltage; and raising the SOC along with raising the grid voltage.

* * * * *